United States Patent [19]
Kawano et al.

[11] Patent Number: 4,926,421
[45] Date of Patent: May 15, 1990

[54] MOBILE RADIO TELEPHONE SYSTEM

[75] Inventors: Minori Kawano; Kazuo Mitsui; Masaharu Hirooka; Yasushi Ozu; Nagayasu Harada; Nobuhiro Kimura, all of Amagasaki, Japan

[73] Assignee: Mitsubishi Denki Kabushiki Kaisha, Tokyo, Japan

[21] Appl. No.: 262,938

[22] Filed: Oct. 18, 1988

[30] Foreign Application Priority Data

Oct. 23, 1987 [JP] Japan ................ 62-268921
May 6, 1988 [JP] Japan ................ 63-108965

[51] Int. Cl.$^5$ .................................. H04J 3/16
[52] U.S. Cl. .................... 370/95.1; 455/33; 455/56; 455/57; 379/60; 379/63
[58] Field of Search ............. 370/95, 110.1, 13, 16, 370/95.1; 455/33, 34, 53, 54, 56, 57, 67, 58; 379/58, 59, 60, 63

[56] References Cited

U.S. PATENT DOCUMENTS

| | | | |
|---|---|---|---|
| 4,096,440 | 6/1978 | Okasaka | 379/59 |
| 4,144,412 | 3/1979 | Ito et al. | 455/33 |
| 4,163,121 | 7/1979 | Yoshikawa et al. | 379/59 |
| 4,242,538 | 12/1980 | Ito et al. | 455/56 |
| 4,759,051 | 7/1988 | Han | 455/33 |
| 4,765,753 | 8/1988 | Schmidt | 379/60 |

FOREIGN PATENT DOCUMENTS

| | | |
|---|---|---|
| 0069275 | 6/1982 | European Pat. Off. . |
| 0126557 | 4/1984 | European Pat. Off. . |
| 1568262 | 1/1977 | United Kingdom . |

OTHER PUBLICATIONS

Kuwabara, S., "Mobile Radio Telephone System", Electronics Communication Society, Feb. 10, 1985, pp. 197-200.

"The Bell System Technical Journal", Jan. 1979, vol. 58, No. 1, pp. 65-67.

Primary Examiner—Douglas W. Olms
Assistant Examiner—Wellington Chin
Attorney, Agent, or Firm—Fleit, Jacobson, Cohn, Price, Holman & Stern

[57] ABSTRACT

In a mobile radio telephone system having multiple base stations controlled by a single line control unit, all base stations use a single common control channel in addition to their voice channels to communicate with a mobile station. If a calling signal from a mobile station is received by two or more base stations at once on the common control channel, the base station with the highest received signal level is selected. If voice signal quality becomes degraded during a call, the call is handed off to the base station with the highest received signal level.

20 Claims, 6 Drawing Sheets

MOBILE RADIO TELEPHONE SYSTEM

BACKGROUND OF THE INVENTION

This invention relates to a mobile radio telephone system having a plurality of base stations.

The purpose of a mobile radio telephone system is to enable a network such as a public switched telephone network to be accessed from a mobile station such as an automobile. Such a system comprises a plurality of zones each having a base station for communication with mobile stations in that zone. It is desirable for the system to have a hand-off function for switching communication from one base station to another as a mobile station moves from one zone to another.

Figure 1:
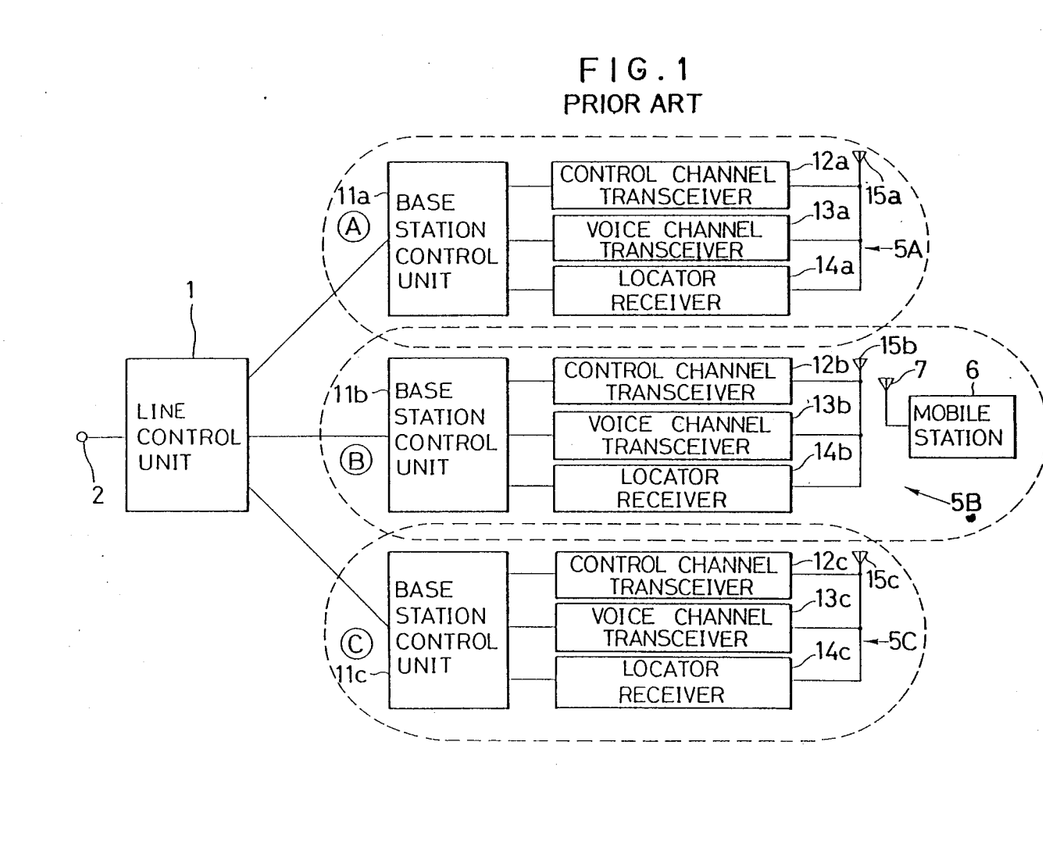
FIG. 1 illustrates a first example of a prior-art mobile radio telephone system having a call hand-off function.

FIG. 1 shows the configuration of a prior-art mobile radio telephone system having a hand-off function, in which the reference numeral 1 denotes a line control unit, 2 is a line of, for example, a public switched telephone network, A, B, and C are cellular zones with base stations 5A, 5B, and 5C, and 6 is a mobile station, and 7 is its mobile antenna. The base stations 5A, 5B, and 5C comprise base station control units 11a to 11c, control channel transceivers 12a to 12c, voice channel transceivers 13a to 13c, locator receivers 14a to 14c, and base station antennas 15a to 15c.

The call hand-off function operates as follows. Separate control channels are allocated to the control channel transceivers 12a to 12c in each cellular zone A, B, and C. Normally system numbers and idle channel signals are transmitted on the control channels in each zone A, B, and C. A mobile station 6 scans all the control channels. When it is in cellular zone B, for example, it receives the control channel signal broadcast from the base station 5B, locks onto this channel, and waits in a standby mode. When the mobile station 6 originates a call, it sends a call request signal on the control channel to which it is currently locked. The call request signal is received by the antenna 15b and the control channel transceiver 12b and transmitted through the base station control unit 11b to the line control unit 1.

The base station control unit 11b allocates an idle voice channel of the voice channel transceiver 13b to the mobile station 6, then sends the mobile station 6 a channel switching signal via the control channel transceiver 12b, instructing the mobile station 6 to switch to the allocated voice channel.

The line control unit 1 decodes the call request signal from the mobile station 6, sends a dialing signal to the telephone line 2, and connects the voice channel of the base station 5B to the telephone line 2. When the answering party on the telephone line 2 goes off-hook, communication is established between the mobile station 6 and the answering party.

If the mobile station 6 moves out of the cellular zone B during the call, the signal quality on the voice channel is degraded. The degradation is detected by the voice channel transceiver 13b, which sends a hand-off request to the line control unit 1 via the base station control unit 11b. The line control unit 1 sends a field measurement request to the base stations, such as the base stations 5A and 5C, adjacent to the base station 5B. Using their locator receivers 14a and 14c, these base stations measure and report the received field intensity on the voice channel allocated to the base station 5B. The line control unit 1 switches the voice channel of the base station reporting the highest measured field intensity, the base station 5A for example, to the channel of the mobile station 6, and switches the telephone line 2 from the base station 5B to the base station 5A, thus handing off the call from the base station 5B to the base station 5A. When the telephone line 2 or the mobile station 6 terminates the call by going on-hook, the base station 5A or the mobile station 6 sends a call end signal and the mobile station 6 returns to the standby mode on the control channel.

A drawback of the system illustrated in FIG. 1 is that the call hand-off procedure is overly complex, and requires each base station to have a locator receiver.

Figure 2:
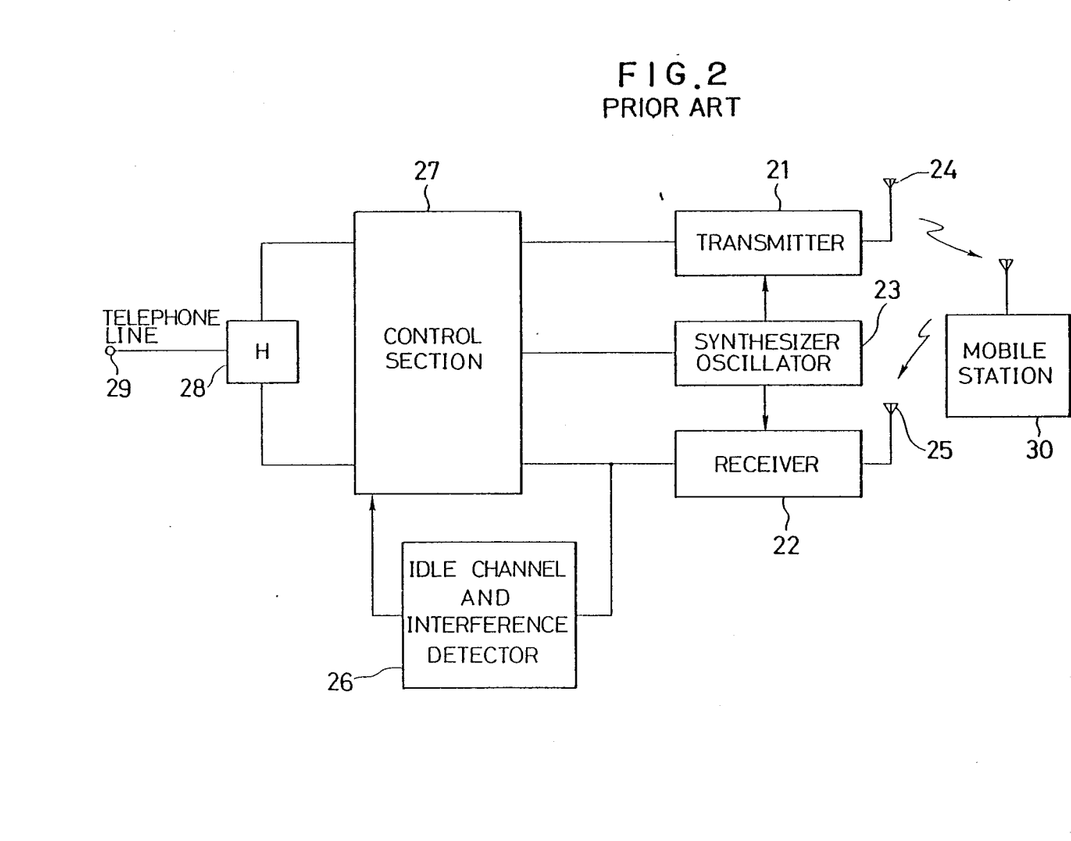
FIG. 2 illustrates a second example of a prior-art mobile radio telephone system.

FIG. 2 shows another example of the prior art, being a block diagram of the base station apparatus described in an article, New Cordless Telephone System in *Equipment on Telecommunication*, a periodical publication of the Telecommunication Association, Vol. 36, No. 3, pp. 134–141, 1979. The apparatus shown in FIG. 2 comprises a transmitter 21, a receiver 22, a synthesizer oscillator 23, a transmitting antenna 24 for the transmitter 21, a receiving antenna 25 for the receiver 22, an idle channel and interference detector 26, a control section 27, a hybrid transformer 28, a telephone line 29, and a mobile station 30. The control section 27 combines the functions of the line control unit and base station control unit in the preceding example.

The apparatus in FIG. 2 operates as follows. The transmitter 21 and the receiver 22 are driven by the same synthesizer oscillator 23. Normally the control section 27 keeps the transmitter 21 and the receiver 22 connected to the control channel, but during a call these are switched to the voice channel. The receiver 22 is connected to the idle channel and interference detector 26, the detection results of which are also supplied to the control section 27.

When the mobile station 30 originates a call on the control channel, the receiving antenna 25 and the receiver 22 receive the calling signal and pass it to the control section 27, which decodes it. The control section 27 enables the idle channel and interference detector 26, switches the transmitter 21 and the receiver 22 to a voice channel, and performs an internal check to ascertain whether another mobile station is using the voice channel. If an idle voice channel can be found by the idle channel detector, the mobile station 30 sends an address signal that is received by the control section 27, and then transmitted by the line control unit in the control section 27 to the telephone line 29. This system is simple because each base station is independent and no separate line control unit is required, but this system has no call hand-off function and makes no provision for the case in which a call from a mobile station 30 is received by two or more base stations.

In the base station apparatus of the cordless telephone system in FIG. 2, the receiver 22 is normally in a standby mode waiting for a call from a mobile station 30 on the control channel, and only switches over to the voice channel when a call is set up. A problem is that if two or more base stations are located proximately, a calling signal intended for only one of the base stations may be received by two or more base stations that are standing by on the control channel. To ensure that the calling signal is received by a particular base station, the control section 27 must have an ID (Identification Data) which is assigned individually to each base station, in which case each base station operates as a distinct system, or the mobile station 30 must register its own ID with a particular base station in advance and specify that base station when originating a call. Such requirements, however, detract from the freedom of use of the system.

SUMMARY OF THE INVENTION

A first object of the present invention is to solve the problems described above.

A second object of this invention is to provide a mobile radio telephone system that is simple to control and does not require the base stations to have a locator receiver.

A third object of this invention is to provide a base station apparatus for a mobile radio telephone system that provides a simple way of identifying the optimal base station for transmitting a call.

According to the invention, there is provided a mobile radio telephone system comprising:

a plurality of base stations disposed in contiguous cellular zones and equipped for communication on a single, common control channel and on a plurality of voice channels;

at least one mobile station equipped to access said common control channel when originating or answering a call, to switch to one of said voice channels when the call is set up, and to transmit a hand-off request on said common control channel if voice signal quality becomes degraded during the call; and a line control unit for centralized control of said base stations, equipped to switch a call from one base station to an adjacent base station in response to said hand-off request.

In a mobile radio telephone system according to this invention, call hand-off requests are transmitted via a common control channel shared by the base stations, so the apparatus is inexpensive and the control program is simple.

Another effect of this invention is that the base station in the optimal receiving location is selected by an extremely simple means, through control of the timing of a signal sent from a base station according to the received signal level at each of a plurality of base stations.

DETAILED DESCRIPTION OF THE EMBODIMENTS

Figure 3:
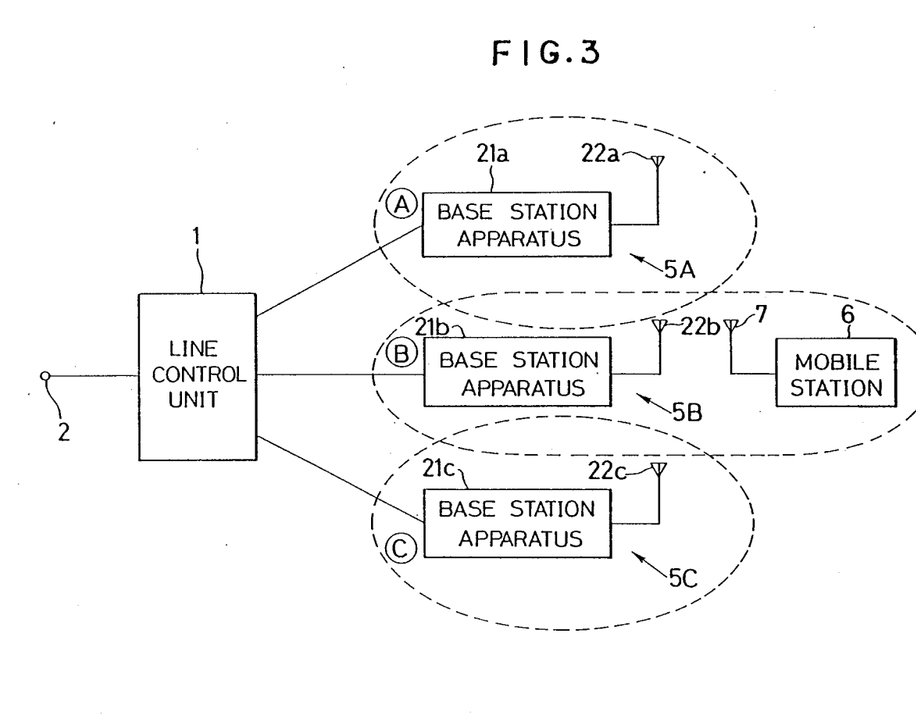
FIG. 3 illustrates a first embodiment of a mobile radio telephone system having a call hand-off function according to the present invention.

A first embodiment of the present invention will be described with reference to FIG. 3. In the system in FIG. 3, the reference numeral 1 denotes a line control unit, 2 is a telephone line connecting the line control unit 1 to, for example, a public switched telephone network, A, B, and C are cellular zones with base stations 5A, 5B, and 5C, and 6 and 7 are a mobile station and its mobile antenna. The base stations 5A, 5B, and 5C comprise base station apparatuses 21a, 21b, and 21c, which include base station transmitter, base station receiver and control circuit, and their antennas 22a, 22b, and 22c.

In this configuration each base station transmitter in apparatuses 21a to 21c is normally tuned to a single, common control channel on which each transmitter transmits intermittently, at intervals determined by a time-division scheme for example, identification (ID) information of its base station and possibly other data such as idle channel information, while each base station receiver in apparatuses 21a to 21c waits in the standby mode. The voice lines and control lines from the base station apparatuses 21a to 21c are concentrated onto the line control unit 1, which controls them and switches their connections to the telephone line 2.

Figure 4:
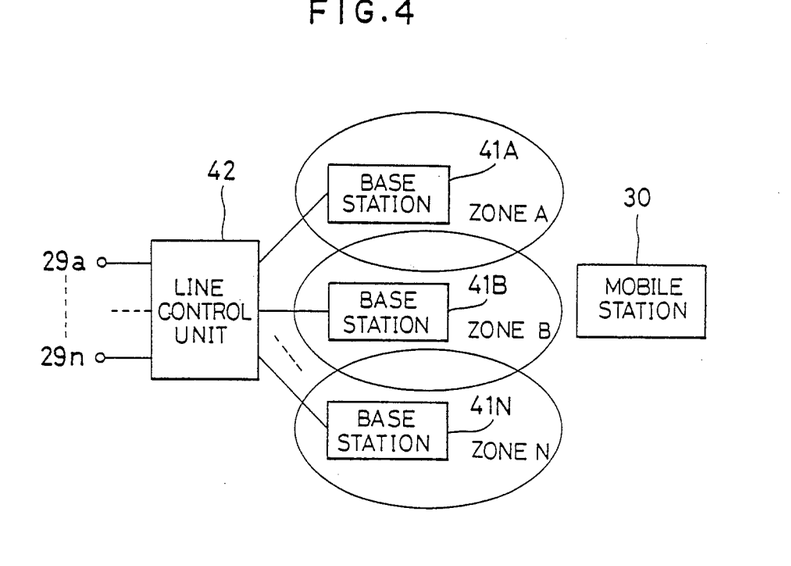
FIG. 4 illustrates the base station apparatus of a mobile radio telephone system according to a second embodiment of this invention.
Figure 5:
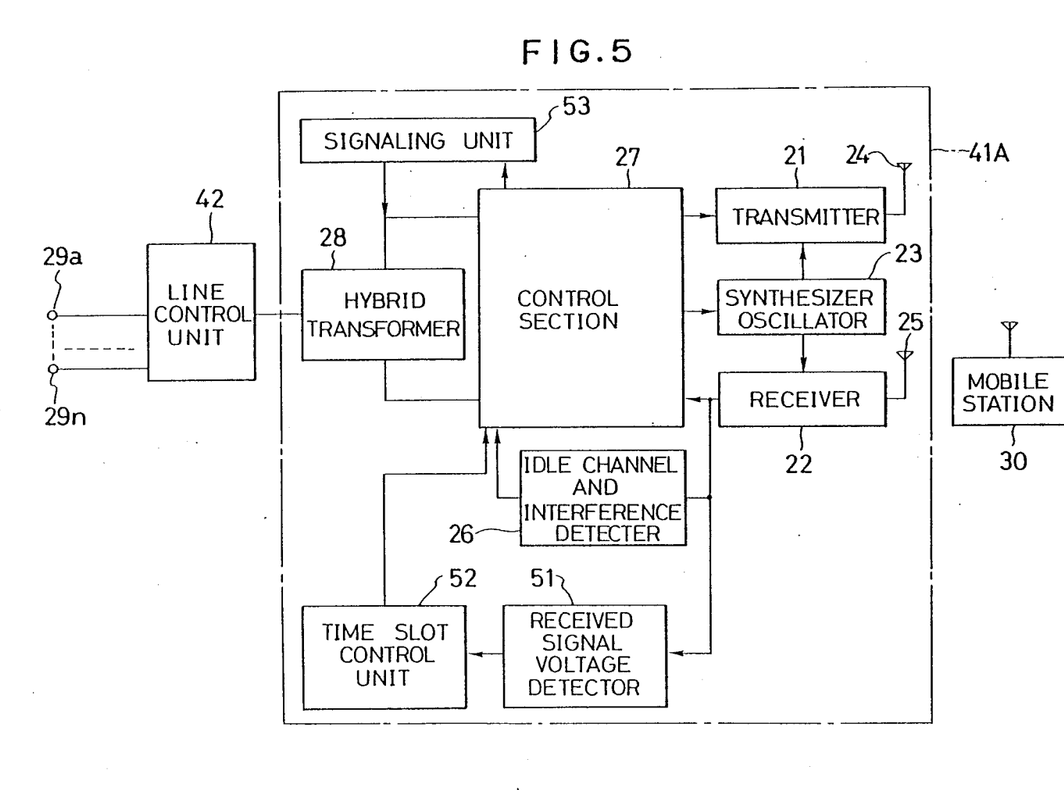
FIG. 5 is a detailed drawing of the base station 41A in FIG. 4.
Figure 7:
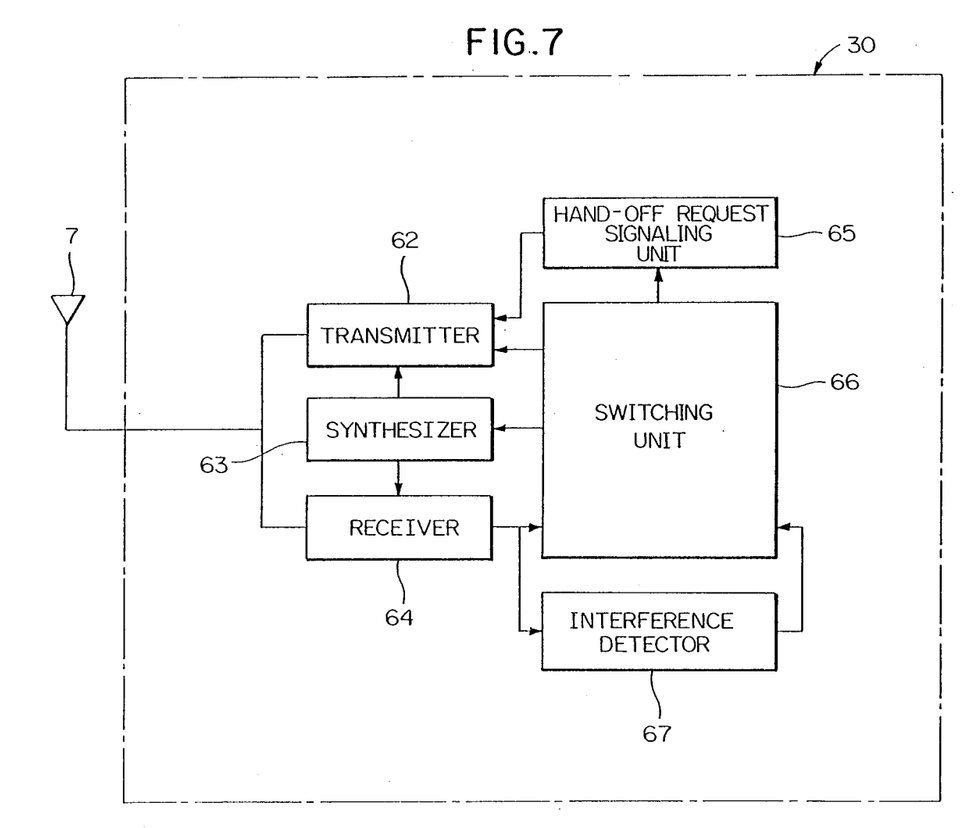
FIG. 7 is a block diagram illustrating the structure of the mobile station according to the present invention.

FIG. 7 illustrates the structure of mobile station 30 in FIGS. 4 and 5. The mobile station 30 has a transmitter 62 and receiver 64 each connected to a synthesizer 63. The synthesizer 63 generates signals to be modulated by transmitting signals and to demodulate RF signal. Voice channel selection in the synthesizer 63 is performed under control of the switching unit 66. Hand-off request signaling unit 65 generates the call end signal, hand-off signal, calling signal and other transmitting signals under control of switching unit 66. Interference detector 67 detects the idle channel and the signal quality from the output signals of receiver 64. Degradation of the voice signal is detected by the interference detector 67 as described above with reference to the mobile station 6 in the first embodiment shown in FIG. 3.

The mobile station 6 normally remains tuned to the common control channel in a standby mode. When the mobile station 6 originates a call in the cellular zone B, for example, the mobile station 6 sends a call originating signal on the common control channel. Since the base stations 5A, 5B, and 5C are all standing by on the common control channel, they all receive the calling signal from the mobile station 6 and send the received number of the mobile station 6 together with the received signal voltage value to the line control unit 1. The line control unit 1 acts as an arbitration unit by instructing the base station with the highest received signal voltage level, the base station 5B for example, to connect with the mobile station 6. The base station 5B then sends on the control channel a signal requesting the mobile station 6 to switch over to the voice channel, while the line control unit 1 connects the base station 5B to the telephone line 2, thus establishing a voice circuit.

During the call the voice signal quality may become degraded, either because the mobile station 6 leaves the cellular zone B or because of interference in the channel. If the mobile station 6 detects interference in the channel with the interference detector, the hand-off request signalling unit 65 sends a call end signal to the base station receiver 21b in the cellular zone B, then the switching unit 66 switches over to the common control channel and triggers the unit 65 to send a call hand-off request signal. If the mobile station 6 leaves the cellular zone B, the switching unit 66 switches directly to the common control channel and triggers the unit 65 to send a hand-off request signal.

When the base station 5A, 5B, or 5C receives a hand-off request signal, it reports the mobile station number and the received signal voltage value to the line control unit 1. The line control unit 1 uses the same procedure as at call origination to connect the mobile station 6 with the base station reporting the highest received signal voltage level and connect that base station to a voice channel on the telephone line 2.

At the end of the call, a call end signal is sent to the base station, which reverts to the common control channel while the line control unit 1 opens the voice channel on the telephone line 2.

In the embodiment described above, degradation of the voice signal is detected by the interference detector 67 of the mobile station, but it is also possible for the base station to detect degradation and notify the mobile station by a control signal on the voice channel currently in use, causing the switching unit 66 of the mobile station to switch to the common control channel and send a hand-off request signal.

A second embodiment of the invention will be described with reference to FIG. 4 and FIG. 5. FIG. 4 illustrates the general equipment configuration of a mobile radio telephone system comprising a mobile station 30, identical base stations 41A to 41N, a line control unit 42 functioning as an arbitration unit, telephone lines 29a to 29n, and cellular zones A to N, which are the service areas of the base stations 41A to 41N. FIG. 5 is a block diagram illustrating one of the base stations, the base station 41A for example. The base station in FIG. 5 comprises a transmitter 21, a receiver 22, a synthesizer oscillator 23, transmitting and receiving antennas 24 and 25, an idle channel and interference detector 26, a control section 27, and a hybrid transformer 28. Also shown are the line control unit 42 and telephone lines 29a to 29n. The foregoing components correspond to components already shown in FIG. 2. The base station according to this invention further comprises a received signal voltage detector 51 for detecting the received signal voltage, a time slot control unit 52 for assigning time slots, and a signaling unit 53 for transmitting signals.

Figure 6:
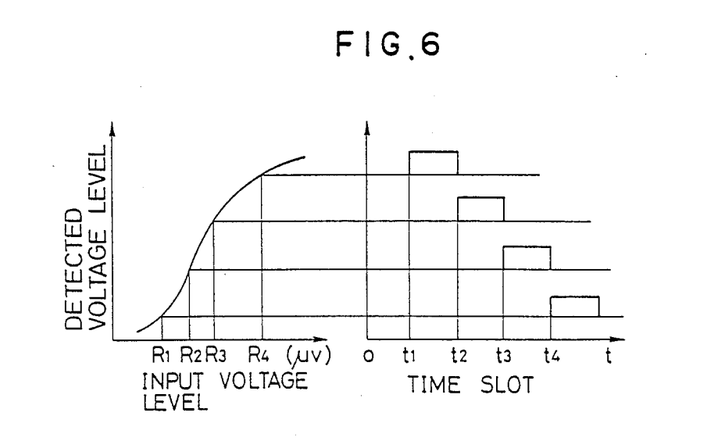
FIG. 6 is a time-slot allocation chart showing the allocation of time slots to received signal levels at the base stations.

FIG. 6 shows how times slots are assigned on the basis of the received signal voltage levels at the base stations 41A to 41N. When the received signal voltage is $R_1$, for example, the signal is sent in time slot $t_4$. Similarly, when the received signal voltage is $R_2$, $R_3$, or $R_4$, time slot $t_3$, $t_2$, or $t_1$ is used, respectively.

This embodiment operates as follows. In FIG. 4, the base stations 41A through 41N are connected to the same line control unit 42, and adjacent zones from A to N overlap. The base stations 41A to 41N are normally all standing by on the common control channel, so when the mobile station 30 originates a call on this control channel, the calling signal is received by a plurality of base stations. If the base stations that receive this calling signal immediately send the received signal to the line control unit 42, control congestion will result; it was to avoid such congestion that the mobile station 30 in the second example of the prior art specified a particular base station, such as the base station 41A, thus disabling communication with all unspecified base stations. In this embodiment of the present invention, however, a simple method described below enables the base station in the optimal receiving location to be identified and selected, even if this base station is not specified by the mobile station 30 in originating the call.

The calling signal from the mobile station 30 is received at substantially the same time by the receiving antennas 25 and receivers 22 at the base stations 41A to 41N, and these signals are passed to the control section 27 in each base station. At each base station the receiver 22 is connected to the received signal voltage detector 51 which detects the input level of the received signal. The time slot control unit 52 assigns a time slot according to the detected level of the received signal and allocates the specified time slot to the control section 27. The control section 27 causes the signaling unit 53 to transmit the calling signal received from the mobile station 30 to the line control unit 42, in the specified time slot. After receiving the first signal which arrives from one of the base stations 41A to 41N, the line control unit 42 ignores the later signals. As a result, the line control unit 42 selects the base station transmitting in the earliest time slot, the base station 41A for example, and connects the call through that base station.

At all of the base stations 41A to 41N the time slot allocation is as illustrated in FIG. 6, with the earliest time slot $t_1$ assigned to the highest received signal voltage level $R_4$ and the other time slots assigned in descending order: $R_3=t_2$, $R_2=t_3$, $R_1=t_4$.

When the line control unit 42 selects the base station that sends the signal in the earliest time slot, it sends that base station a signal informing it that it has been selected. Upon receiving this signal from the line control unit 42, the base station next detects an idle channel among the plurality of voice channels on which it can operate and switches over from the control channel to the idle channel.

In this way the base station that receives the calling signal from the mobile station 30 with the highest received signal level is selected to connect the call. This simple procedure avoids congestion of control in the line control unit 42, but enables the optimal base station to be selected for connection of the call.

In this embodiment, the mobile station 30 does not specify a particular base station, and all the time slots are assigned in descending order of the received signal level. As a variation of this embodiment, the mobile station 30 can specify a preferred base station when originating a call, in which case the specified base station is given priority for the first time slot, and the second and subsequent time slots are assigned in descending order of received signal level.

As another variation of this embodiment, the received signal levels can be divided into a plurality of stepwise ranges and time slots can be assigned by a random number rule within each range.

As a further variation, the time slot control unit 52 and the signaling unit 53 can be implemented by software through programs running on a processor in the control section 27, instead of as separate facilities operating independently of the control section 27 as shown in FIG. 5.

As yet another variation, the mobile station 30 can function as the arbitration unit. In this case the base stations 41A to 41N that receive a calling signal from the mobile station 30 connect their transmitter 21 to the signaling unit 53 and send a response signal to the mobile station 30 in a time slot selected by the time slot control unit 52. The mobile station 30 is designed to select the base station that sends a response signal in the earliest time slot and notify this base station, by its base station ID, that it has been selected. That is, the time slots selected by the time slot control units 52 are used not to relay the calling signal from the mobile station 30 through the base stations 41A to 41N to the line control unit 42, which then instructs the base station that sends the calling signal in the earliest time slot to connect to the mobile station 30, but to return a response signal directly to the mobile station 30.

As still another variation, instead of relaying the unaltered calling signal from the mobile station 30 through the signaling unit 53 to the line control unit 42 in the selected time slot, the base station can convert the calling signal to another signal and send the other signal in its place.

The scope of this invention includes the preceding variations, as well as other variations which will be obvious to one skilled in the art.

What is claimed is:

1. A mobile radio telephone system comprising:
   a plurality of base stations disposed in contiguous cellular zones and equipped for communication on a single, common control channel and on a plurality of voice channels, each of said voice channels communicating a voice signal to a corresponding base station within its respective cellular zone;
   at least one mobile station equipped to access said common control channel when originating or answering a call from one of said base stations, to switch to one of said voice channels at the occurrence of the call, and to transmit a hand-off request on said common control channel if the quality of the voice signal becomes degraded during the call; and
   a line control unit for centralized control of said base stations, equipped to switch a call from one of said plurality of base stations to an adjacent base station of said plurality of base stations in response to said hand-off request.

2. A mobile radio telephone system according to claim 1 in which, when said line control unit receives said hand-off request from said mobile station, said line control unit switches the call to one of the base station receiving the voice signal at a higher signal level.

3. A mobile radio telephone system according to claim 1 in which, when said mobile station transmits said hand-off request on said common control channel, said mobile station receives in reply via said common control channel, a channel switching signal instructing it to switch to a voice channel corresponding to the base station which receives the voice signal at the higher signal level.

4. A mobile radio telephone system according to claim 1 in which, when said mobile station detects degradation of voice signal quality during a call, before switching to the common control channel of the base station currently receiving the call and sending a hand-off request, said mobile station sends a call end signal to the base station with which it is currently communicating to discontinue us of its corresponding voice channel.

5. A mobile radio telephone system according to claim 1 in which, when said mobile station detects degradation of voice signal quality, said mobile station switches immediately to said common control channel used by all the base stations and sends a hand-off request.

6. A mobile radio telephone system according to claim 1 in which, when voice quality is degraded due to interference on the same channel, said mobile station sends a call end signal to the base station with which it is currently communicating to discontinue use of its corresponding voice channel, then switches to the common control channel and sends a hand-off request signal, but when voice quality is degraded because said mobile station has left the cellular zone corresponding to the base station which it is currently communicating with, said mobile station switches immediately to said common control channel and sends a hand-off request without sending a call end signal to the base station with which it is currently communicating to discontinue use of its corresponding voice channel.

7. A mobile radio telephone system according to claim 1, in which either said mobile station or said base station, or both, have a circuit for detecting degradation of the quality of the voice signal by detecting reduced received signal level or interference on the voice channel supporting the voice signal.

8. A mobile radio telephone system according to claim 1, in which said base stations have means for detecting voice signal degradation, and when a base station detects voice degradation, it sends a control signal to said mobile station via the voice channel currently in use for the call, to cause said mobile station to switch to said common control channel and send a hand-off request.

9. A mobile radio telephone system according to claim 1, wherein said base stations normally transmit identification data or idle channel signals by a time-division multiplexing scheme on said common control channel.

10. A mobile radio telephone system comprising a plurality of base stations connected to a single line control unit, and at least one mobile station with which said base stations communicate via a common control channel and one or more voice channels, wherein the system comprises:
    received signal voltage detection means for detecting the received signal voltage level at the base station;
    signal transmitting means for transmitting a signal indicating the received signal voltage level detected by the received signal voltage detection means; and
    an arbitration means for receiving the signal transmitted from the signal transmitting means and selecting a particular one of the two or more base stations that receive a calling signal originated from the mobile station; and
    time slot selection means in each of said base stations for selecting a particular time slot of a plurality of time slots depending on the detected voltage level and triggering the signal transmitting means to transmit a response signal to the arbitration means indicating that the received signal voltage level in the time slot selected by said time slot selection means.

11. A mobile radio telephone system according to claim 10, wherein each of the base stations connected to the single line control unit normally stands by to receive a calling signal from a mobile station on the common control channel, and when a particular base station receives the calling signal, it detects an idle voice channel among said plurality of voice channels, switches from said common control channel to the detected idle voice channel, and thereafter uses said idle voice channel.

12. A mobile radio telephone system according to claim 10, in which the plurality of base stations are disposed in overlapping zones and a calling signal from a mobile station within a particular one of said zones is received by two or more base stations within said particular one of said zones at substantially the same time.

13. A mobile radio telephone system according to claim 10, in which said time slot selection means selects an earlier or later time slot depending on the received signal voltage level, and wherein earlier time slots are assigned for a higher levels of the detected received voltage signals.

14. A mobile radio telephone system according to claim 10, in which the received signal voltage levels are divided into a plurality of stepwise ranges and time slots are selected within each stepwise range by a random number rule.

15. A mobile radio telephone system according to claim 10, in which if a mobile station specifies in a calling signal to communicate with a particular one of said base stations, said time slot selection means assigns the first time slot preferentially to the particular base station.

16. A mobile radio telephone system according to claim 10 in which, when said calling signal is transmitted in the selected time slot via said signal transmitting particular to said base station means, said calling signal is transmitted without alteration.

17. A mobile radio telephone system according to claim 10 in which, when said calling signal is transmitted in said selected time slot via said signal transmitting means, it is converted to a different signal, and said different signal is transmitted in place of the calling signal.

18. A mobile radio telephone system according to claim 10, in which said line control unit functions as said arbitration unit and selects, from the base stations that receive said calling signal originating from said mobile station, the base station that transmits a response signal in the earliest time slot, and sends a signal to that base station notifying it that it has been selected.

19. A mobile radio telephone system according to claim 10, in which said mobile station functions as said arbitration unit and selects, from the base stations that receive said calling signal originating from said mobile station, the base station that transmits a response signal in the earliest time slot, and sends a signal to that base station notifying it that it has been selected.

20. A mobile radio telephone system according to claim 10, in which the time slot selection means and signal transmitting means are independent circuits.

* * * * *